F. M. BUDLONG.
WRENCH.
APPLICATION FILED FEB. 18, 1918.
1,316,875.
Patented Sept. 23, 1919.
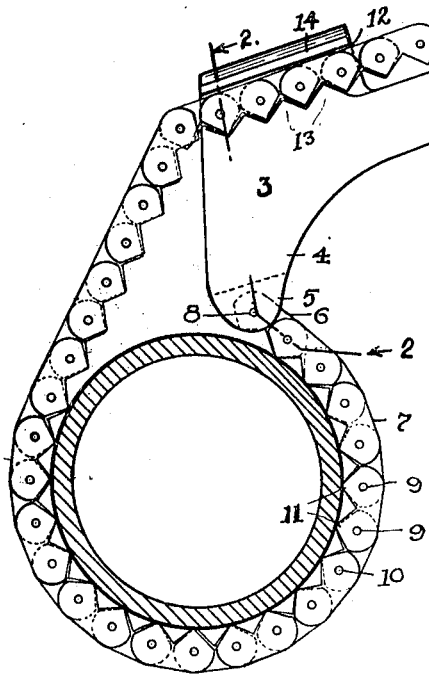
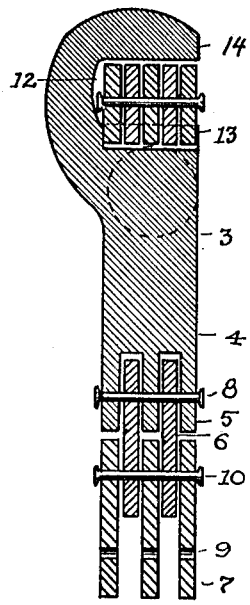
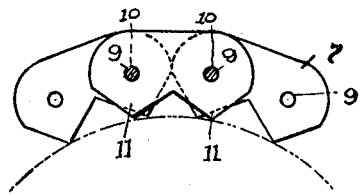
Witness
Geo. E. Kricker.
Inventor
Frank M. Budlong.
By Fisher & Mott
Attorneys

UNITED STATES PATENT OFFICE.

FRANK MAURICE BUDLONG, OF SAN JOSE, CALIFORNIA, ASSIGNOR OF FORTY-FIVE ONE-HUNDREDTHS TO JOHN MOORE CURRAGH, OF SAN JOSE, CALIFORNIA.

WRENCH.

1,316,875.  Specification of Letters Patent.  Patented Sept. 23, 1919.

Application filed February 18, 1918. Serial No. 217,756.

*To all whom it may concern:*

Be it known that I, FRANK MAURICE BUDLONG, citizen of the United States, residing at San Jose, in the county of Santa Clara and State of California, have invented certain new and useful Improvements in Wrenches, of which the following is a specification.

My invention pertains to an improvement in wrenches, the object being to provide a wrench in which a chain of links of special construction afford a positive grip uniformly around a nut or pipe or any other article regardless of whether it be square, hexagonal, round or other shape. The wrench handle is also provided with a channel having opposite walls conforming to the shape of the chain, whereby the chain may be quickly connected and disconnected from the handle as well as adjusted to the work to effect the best operating results.

In the accompanying drawings, Figure 1 is a side view of my improved wrench applied to a pipe. Fig. 2 is a cross section on line 2—2, Fig. 1, of the wrench, and Fig. 3 is an enlarged detail of a few links showing the working relation of the adjacent teeth of the connected links.

The wrench comprises a handle member 2 having a head 3 with an offset 4 terminating in spaced ears 5 with which a pair of terminal links 6 of a chain of links 7 are pivotally connected by a pin 8. The links 7 of the entire chain are of corresponding size and shape, each consisting of a flat plate having two perforations 9 for a link pin 10. One longitudinal edge of each link plate is toothed or serrated, and preferably only two angular pointed teeth 11 are used although three or more may be used. As shown, the high point of each tooth is directly opposite the link pin opening or perforation 9, and when the chain is stretched taut on a straight line the points of adjacent teeth are alined but when the chain encircles a round object the points of adjacent teeth of the connected links turn to different radial positions relatively to each other and thus engage the work at different radial points also. Moreover, when the chain encircles an article having a corner or corners, for example a square or hexagonal nut, the recesses or depressions between the teeth accommodate such corners and permit the links which turn the corner or corners to establish an effective working relation at the corner and effective engagement at the straight stretches of chain.

One result is that the pressure applied to the work is uniformly distributed, and where a pipe or tube is being operated upon there are no harmful crushing strains localized therein. Thus, the height or distance of projection of the teeth 11 from the pivot pins 10 is such, especially where connected to the ears 5 of the jaw or offset 4, that the jaw or head of the handle will not engage the work, but all engagement be at the teeth of the chain.

The free end of the chain is passed around the work and connected with the upper side of the head 3 of the handle, and to permit a quick detachable connection to be made as well as a safe and secure connection, I provide a channel 12 extending longitudinally of the handle opposite head 3 in which the chain may be removably seated, and also provide a row of teeth 13 in one wall of the channel at the upper side or edge of the head conforming to the angular shape of the teeth 11 of the chain. When the chain is seated in the channel the lip or flange 14 and the teeth 13 prevent displacement of the chain excepting as it may be purposely removed and disengaged therefrom by a lateral movement. This arrangement provides an effective quick-detachable and attachable locking connection for the chain, and the loop in the chain may be lengthened or shortened link by link at will and very conveniently. Any number of link plates may be arranged side by side, dependent upon the strength of chain and area of gripping surface desired, but a very strong grip may be effected by a limited number of such chain plates, and a relatively narrow wrench will give effective service and permit its use in places where the working room is limited.

Thus, the wrench may be used on heads of pipe fittings, outside diameter of flanges, or on an angle of any known pipe fitting, such as an elbow, T, union, etc. The cost of such a wrench is also relatively cheap as the handle or main body of the wrench may be cast in steel or drop forged, and machine work practically eliminated, while the chain plates forming each block of links can be produced at a minimum cost, being all of the same style or shape.

In operation, the wrench works easily and with a ratchet effect, that is, when pressure is exerted in a downward direction on the handle a positive grip of the chain teeth is obtained on the work, and where a pipe is engaged as shown in Fig. 1, the toothed engagement extends approximately around three-quarters of the circumference of the pipe. Then as the handle is raised the chain releases its grip, and a new gripping relation may be established. The pressure on the pipe is equally distributed at all points where the chain comes in contact with the pipe, and the wrench differs from the ordinary chain wrenches in use in that the head of the handle is not provided with a jaw to engage the work but is designed to have the chain do the entire gripping and thus relieve the crushing effect such as a jaw would exert locally if used upon the work. In my wrench the leverage compounded in the head at the separated points of connection for the chain serves to tighten the chain without actual engagement of the handle or its head with the work, and a reverse movement of the handle instantly releases the grip of the chain.

What I claim is:

1. A wrench comprising a handle with a head at one end having a toothed channel lengthwise on its top and open at one side and a projection at the bottom of said head opposite said channel, a chain consisting of parallel flat sided links pivoted in said projection and each link provided with dual teeth on its inner edge opposite the pivot connections thereof and adapted to be engaged laterally with the teeth in said channel.

2. A wrench having a handle with a head provided with a straight longitudinal channel on its top open along one side and having a plurality of teeth across its bottom, and the said head provided with a downward projection having ears at its extremity, in combination with a chain having a series of flat sided links in parallel arrangement and connected by pins through their ends and each link having a set of teeth at its inner edge adapted to engage the teeth in said channel and a plain outer edge adapted to bear against the top of the said channel when thus engaged.

3. A wrench having a unitary handle and head and said head having a channel on its top open lengthwise at one side and provided with a series of teeth transversely in its bottom and a downward projection at the bottom of said head having a plurality of ears spaced apart, in combination with a chain engaged at its end between said ears and consisting of a series of flat sided links pivotally connected by cross pins through their ends and staggered alternately, and said links having each a single tooth at its end opposite the pivot pin therein and adapted to seat between the teeth in said channel.

Signed at San Jose, in the county of Santa Clara, and State of California, this 4th day of February, 1918.

FRANK MAURICE BUDLONG.

Copies of this patent may be obtained for five cents each, by addressing the "Commissioner of Patents, Washington, D. C."